J. L. STOFFER.
BOLT LOCKING DEVICE.
APPLICATION FILED NOV. 12, 1907.
901,563.
Patented Oct. 20, 1908.
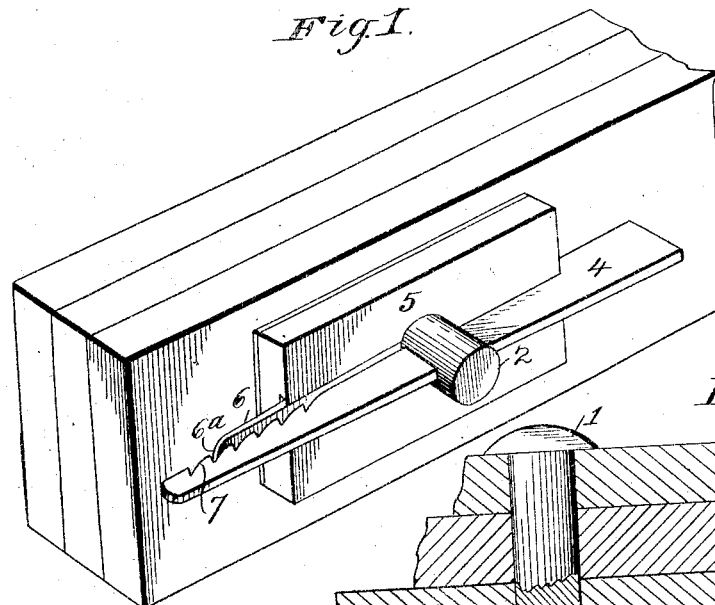
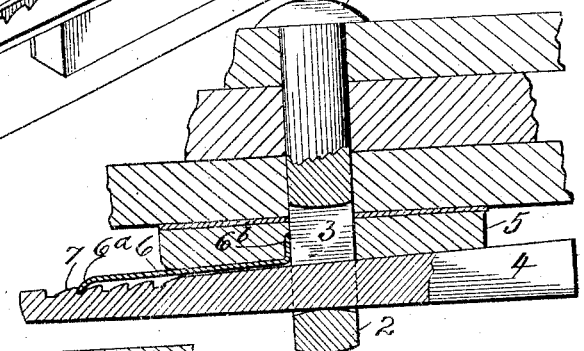
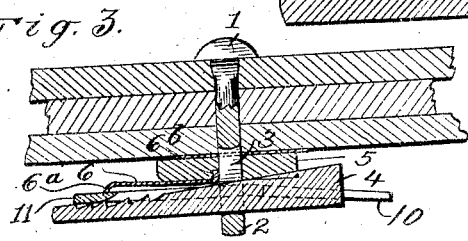
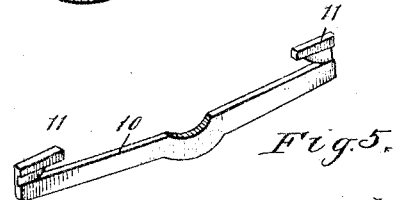
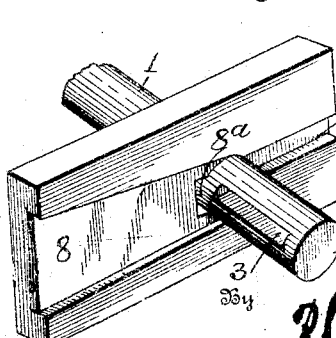
Inventor
Jacob L. Stoffer

UNITED STATES PATENT OFFICE.

JACOB L. STOFFER, OF HOMEWORTH, OHIO.

BOLT-LOCKING DEVICE.

No. 901,563.

Specification of Letters Patent.

Patented Oct. 20, 1908.

Application filed November 12, 1907. Serial No. 401,891.

*To all whom it may concern:*

Be it known that I, JACOB L. STOFFER, a citizen of the United States, residing at Homeworth, in the county of Columbiana and State of Ohio, have invented certain new and useful Improvements in Bolt-Locking Devices, of which the following is a specification.

This invention provides certain new and useful means for locking bolts securely in applied position, and the object of the invention is an improved bolt locking device which is prevented from being accidentally displaced from operative position, and which may be readily removed to release the bolt when desired.

With this and other objects in view as will more fully appear as the description proceeds, the invention consists in certain constructions and arrangements of parts that I shall hereinafter fully describe and then point out the novel features thereof in the appended claims.

For a full understanding of the invention and the merits thereof, reference is to be had to the following description and accompanying drawing, in which:

Figure 1 is an enlarged perspective view of my improved bolt locking device applied to a bolt. Fig. 2 is an enlarged horizontal section thereof. Fig. 3 is a similar view showing the key bar holding the tongue out of operative position. Fig. 4 is a perspective view of the key bar, and Fig. 5 is an enlarged perspective view of the washer mounted on the slotted end of the bolt. Fig. 6 is a perspective view of the spring tongue.

Corresponding and like parts are referred to in the following description and indicated in all the views of the drawings by the same reference characters.

My improved bolt locking device is applied to a bolt 1 formed in its extremity 2 with a longitudinally extending slot 3 and designed to be applied to the required work with its slotted extremity 2 protruding therefrom. The bolt 1 is held in position by a wedge 4 designed to be inserted in the slot 3 of said bolt and to bear against a washer 5 encircling the latter contiguous to the work, a spring tongue 6, supported on said washer 5, engaging the wedge 4 to prevent its accidental retraction. One edge of the wedge 4 is serrated to form a series of teeth 7 which are designed for operative engagement by an outturned end 6ª of the spring tongue 6. The main portion 6 fits in a recess 8 provided in the outer face of the washer 5, the other end of said tongue being formed with an inwardly extending lug 6ᵇ which fits in a nick or socket 8ª formed in the recess 8, for the purpose of preventing any longitudinal movement of the tongue out of the said recess. The washer 5 is formed with a groove 9 extending in the opposite direction from the recess 8, said groove being designed for the reception of a portion of the inner edge of the wedge 4, whereby to prevent any lateral or twisting movement of the wedge relative to the washer and thus retaining the spring tongue 6 in engagement with one of the teeth 7. The slot 9 also permits the outer edge of the wedge to assume a position perpendicular to the bolt 1, thereby distributing the outward force of the said wedge squarely against the outer wall of the slot 3.

To release the bolt 1, it is only necessary to depress the tongue 6 to hold the outturned end thereof out of engagement with the teeth 7 of the wedge and to retract the said wedge from its position. With a view to rendering the depression of the tongue 6 more easily accomplished, I have provided a key bar 10 which is formed with hooked end portions 11. The hooked portion 11 is designed to be slipped around the inner edge of the wedge 4 contiguous to the spring tongue 6, the opposite end of the bar 10 being pushed inwardly. The bar serves as a lever with the fulcrum on the inner edge of the wedge, the inward movement of the opposite end of said bar serving to press the tongue inwardly to hold it out of engagement with the teeth 7.

It is to be understood that if necessary, I may provide one or more washers between the washer 5 and the work.

Having thus described the invention, what I claim is:

1. The combination with a bolt formed with a slot, of a bolt locking device comprising a washer encircling said bolt and formed with a recess and a groove, said recess having a socket, a wedge designed to be inserted in the slot of the bolt and fitting in said groove, said wedge being formed with a series of teeth, and a spring tongue fitting in said recess and formed at one end with a lug received in said socket the other end of the tongue being outturned to engage the teeth of the wedge, whereby to prevent the accidental retraction of the latter.

2. The combination with a bolt having a slot, of a bolt locking device comprising a washer encircling said bolt and formed with a recess and a groove, a wedge designed to be inserted in the slot of the bolt and fitting in said groove, said wedge being formed with a series of teeth, and a spring tongue removably secured in the recess and adapted to engage one of the series of teeth, as and for the purpose set forth.

In testimony whereof I affix my signature in presence of two witnesses.

JACOB L. STOFFER. [L. S.]

Witnesses:
    JNO. A. STOFFER,
    J. F. BARNEN.